(12) United States Patent
Albornoz et al.

(10) Patent No.: US 7,689,578 B2
(45) Date of Patent: Mar. 30, 2010

(54) DEALING WITH ANNOTATION VERSIONING THROUGH MULTIPLE VERSIONING POLICIES AND MANAGEMENT THEREOF

(75) Inventors: Jordi Albornoz, Cambridge, MA (US); Brian J. Cragun, Rochester, MN (US); Lee D. Feigenbaum, Brookline, MA (US); Kyle L. Henderson, Mantorville, MN (US); Robert R. Nelson, Rochester, MN (US); Cale T. Rath, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1422 days.

(21) Appl. No.: 10/757,793

(22) Filed: Jan. 15, 2004

(65) Prior Publication Data

US 2005/0160356 A1 Jul. 21, 2005

(51) Int. Cl.
*G06F 17/00* (2006.01)

(52) U.S. Cl. .................. 707/102; 707/104.1; 715/229; 715/230

(58) Field of Classification Search ................ 707/102; 715/512
See application file for complete search history.

(56) References Cited

U.S. PATENT DOCUMENTS

| | | | | |
|---|---|---|---|---|
| 6,014,677 | A * | 1/2000 | Hayashi et al. | 707/104.1 |
| 6,519,603 | B1 | 2/2003 | Bays et al. | |
| 6,687,878 | B1 * | 2/2004 | Eintracht et al. | 715/512 |
| 7,051,274 | B1 * | 5/2006 | Cottrille et al. | 715/210 |
| 7,051,275 | B2 * | 5/2006 | Gupta et al. | 715/512 |
| 7,218,783 | B2 * | 5/2007 | Bargeron et al. | 382/188 |
| 7,243,301 | B2 * | 7/2007 | Bargeron et al. | 715/205 |
| 7,392,466 | B2 * | 6/2008 | Pan et al. | 715/200 |
| 2003/0110472 | A1 * | 6/2003 | Alloing et al. | 717/122 |
| 2004/0205545 | A1 * | 10/2004 | Bargeron et al. | 715/512 |
| 2004/0252888 | A1 * | 12/2004 | Bargeron et al. | 382/188 |
| 2004/0260717 | A1 * | 12/2004 | Albornoz et al. | 707/102 |
| 2004/0260929 | A1 * | 12/2004 | Albornoz et al. | 713/176 |
| 2004/0261016 | A1 * | 12/2004 | Glass et al. | 715/512 |

OTHER PUBLICATIONS

U.S Appl. No. 60/481,003, Jeffery Glass, Jun. 20, 2003.*
Dettinger et al., IBM U.S. Appl. No. 10/083,075, filed Feb. 26, 2002, "Application Portability and Extensibility Through Database Schema and Query Abstraction".
Chatterjee et al., IBM U.S. Appl. No. 10/600,014, filed Jun. 20, 2003, "Universal Annotation Management System".
Cragun et al, IBM U.S. Appl. No. 10/600,382, filed Jun. 20, 2003, "Heterogeneous Multi-Level Extendable Indexing for General Purpose Annotation Systems".

* cited by examiner

*Primary Examiner*—John R. Cottingham
*Assistant Examiner*—Michael Pham
(74) *Attorney, Agent, or Firm*—Patterson & Sheridan, LLP (57) ABSTRACT

Methods, systems, and articles of manufacture for maintaining annotations for changing source documents are provided. For some embodiments, an annotation system may support multiple policies, with each policy dictating how (or if) an annotation created for a version of a source document should be applied to subsequent versions of the source document. For some embodiments, a user creating an annotation may select from a group of available policies to be applied to the annotation.

22 Claims, 9 Drawing Sheets

| POLICIES FOR MAINTAINING ANNOTATIONS FOR MULTIPLE VERSIONS OF A DOCUMENT | |
|---|---|
| POLICY | DESCRIPTION |
| NO CHANGE | IF A DOCUMENT IS CHANGED, THE ORIGINAL ANNOTATION DOES NOT APPLY TO THE NEW DOCUMENT |
| APPLY ANNOTATIONS TO MULTIPLE VERSIONS | AN ANNOTATION ON AN ORIGINAL DOCUMENT ALSO APPLIES TO A SUBSEQUENT VERSION(S) OF THE DOCUMENT |
| CARRY ANNOTATIONS FORWARD TO NEW VERSIONS | A COPY OF EACH ANNOTATION IS CARRIED FORWARD TO THE MOST ACCURATE POSITION IN SUBSEQUENT VERSIONS OF A DOCUMENT |
| VALIDATION REQUIRED | AN AUTHORIZED USER MUST VALIDATE AN ANNOTATION BEFORE IT IS CARRIED FORWARD TO SUBSEQUENT VERSIONS OF A DOCUMENT |

VIEW ANNOTATION

AUTHOR: A. RESEARCHER

CREATED: 01/02/03

CREATED FOR DOC VERSION: 1* — 486

COMMENTS

THIS SECTION COULD BE EXPANDED TO INCLUDE THE FOLLOWING EXAMPLES...

*ANNOTATION HAS NOT BEEN VERIFIED FOR SUBSEQUENT VERSIONS.  RE-VERIFY — 484

DEALING WITH ANNOTATION VERSIONING THROUGH MULTIPLE VERSIONING POLICIES AND MANAGEMENT THEREOF

CROSS-REFERENCE TO RELATED APPLICATIONS

The present application is related to commonly-owned U.S. Pat. No. 6,519,603, entitled "Method And System For Organizing An Annotation Structure And For Querying Data And Annotations", commonly-owned, co-pending application Ser. No. 10/083,075, entitled "Application Portability And Extensibility Through Database Schema And Query Abstraction," Ser. No. 10/600,014, entitled "Universal Annotation Management System", Ser. No. 10/310,192, entitled "Annotation Validation Using Partial Checksums", and application Ser. No. 10/757,792, entitled: "Maintaining Annotations for Distributed and Versioned Files", filed herewith, which are herein incorporated by reference in their entirety.

BACKGROUND OF THE INVENTION

1. Field of the Invention

The present invention generally relates to annotating data objects and, more particularly, to maintaining annotations across different versions of data objects.

2. Description of the Related Art

An annotation system is one where descriptive information is stored about objects, or parts of objects, as an annotation. Some annotation systems store annotations separately, without modifying the objects themselves. An annotation store, typically a database, contains information for the annotation, typically in the form of descriptive text, or other classifiers. An indexing scheme is typically used to map each annotation to the object or positions of annotated portions within the object. The annotation system may be configured to display the annotation in response to the user selecting the annotated portions of the object. For example, one common method for displaying annotations is in a flyover text box generated when a user positions a mouse pointer in proximity to the annotated portion or portions of the object.

The annotations themselves may serve different functions for different applications. For example, for some applications, annotations may serve as an interactive help system, providing description of the functionality, or explain the use of the annotated object. As an example, in a business application, an annotation may explain the use of an economic performance parameter, such as a current year's revenue by division. For other applications, annotations may serve to provide expert feedback, comments, or clarifications from a reviewer or a creator of a document or other data object. As examples, the creator of a document may insert an annotation highlighting the relevance of a certain piece or group of data, while a reviewer of the same document may insert an annotation with instructions for revising the document, possibly to correct an error.

A challenge is presented, however, when an annotated document is changed, for example, creating a new version of the document. A policy should be established that determines how annotations should be maintained for different versions of a document. One approach is to apply a "no-change" policy on the document, whereby annotations are maintained for the original document only and do not apply to subsequent versions. While this approach is simple, there may be many cases where at least some annotations would apply to a subsequent version of a document, such as when the particular portion described by the annotation has not changed. Therefore, another approach would be to "carry-forward" annotations to subsequent versions of a document. However, in some cases, some of the annotations may no longer apply, such as when an annotated portion of the document is edited to render the annotation invalid or deleted entirely. Further, even if the annotation does apply to the new version, annotation indexes indicating the corresponding annotated portions of the document may need to be updated to reflect the changes in the document.

Thus, each of these policies has drawbacks and using either alone provides a less than ideal solution. Accordingly, there is a need for an annotation system that supports multiple policies for maintaining annotations after changes to an annotated source document, for example, allowing an annotation author to select one or more policies that best fit a particular situation.

SUMMARY OF THE INVENTION

The present invention generally is directed to a method, system and article of manufacture for annotating multiple versions of a document.

One embodiment provides a method for applying annotations to multiple versions of a document generally including providing an interface allowing a user to create an annotation for a current version of a document and to specify how the annotation should be applied to a subsequent version of a document.

Another embodiment provides a method for managing annotations for multiple versions of documents. The method generally includes selecting one or more annotation versioning policies dictating how annotations made for a current version of a document should be applied to a subsequent version of the document and allowing creators of annotations for a current version of a document to select one or more of the annotation versioning policies to dictate how the annotations should be applied to subsequent versions of the document.

Another embodiment provides a computer-readable medium containing a program for managing annotation for multiple versions of documents. When executed by a processor, the program performs operations generally including providing an interface allowing a user to create an annotation for a current version of a document and to specify how the annotation should be applied to a subsequent version of a document.

Another embodiment provides a data processing system generally including at least one application for manipulating a document, an annotation store for storing annotation records containing annotations for the document, and one or more interface screens, accessible from the at least one application, allowing a user to create an annotation for a selected portion of a current version of the document and to specify how the annotation should be applied to subsequent versions of the document. The data processing system may also include an executable component generally configured to detect changes resulting in a subsequent version of the document and apply the annotation to the subsequent version of the document in a manner specified by the user via the one or more interface screens.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides methods, systems, and articles of manufacture for maintaining annotations for changing source documents. For some embodiments, an annotation system may support multiple policies, with each policy dictating how (or if) an annotation created for a version of a source document should be applied to subsequent versions of the source document. A user creating an annotation may select from a group of available policies to be applied to the annotation.

As used herein, the term document generally refers to any type of content containing data object including, but not limited to, text documents, spreadsheets, schematics, images, media files, and the like. The term version, when applied to a document, merely refers to the content of the document at a corresponding time and does not imply that multiple versions of a document necessarily exist at any time. In other words, a subsequent version of a document may exist without of previous version still existing. Further, there is no implication that different versions of a document will have a common file name with version appended (e.g., v2, v3, etc.). Accordingly, a document modified and saved with an entirely different name may still constitute a different version of the document. As used herein, the term annotation generally refers to any type of descriptive information associated with one or more data objects. Annotations may exist in various forms, including textual annotations (descriptions, revisions, clarifications, comments, instructions, etc.), graphical annotations (pictures, symbols, etc.), sound clips, etc. While an annotation may exist in any or all of these forms, to facilitate understanding, embodiments of the present invention may be described below with reference to textual annotations as a particular, but not limiting, example of an annotation. Accordingly, it should be understood that the following techniques described with reference to textual annotations may also be applied to other types of annotations, as well, and, more generally, to any type of reference to a data object.

As used herein, the term change detection value generally refers to any numerical, derived, or filtered value, regardless of length, generated by an algorithm performed on portions of data to encode, detect changes in, or validate completeness of the portions of data. Any suitable algorithm may be used to generate the change detection value, including, but not limited to, simple summing algorithms and more complex algorithms, such as cyclic redundancy check (CRC) algorithms and MD5 filtering functions commonly used to generate checksums. Further, a change detection value may be larger than the portions of data or the portions of data may be used as a change detection value. While a change detection value may be all of these, to facilitate understanding, embodiments of the present invention may be described with reference to a checksum as a particular, but not limiting, example of a change detection value. Accordingly, the following references to checksums may be applied to change detection values in general.

Further, as used herein, the term user may generally apply to any entity utilizing the annotation system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

One embodiment of the invention is implemented as a program product for use with a computer system such as, for example, the enterprise system 100 shown in FIG. 1 and described below. The program(s) of the program product defines functions of the embodiments (including the methods described herein) and can be contained on a variety of computer-readable medium. Illustrative computer-readable mediums include, but are not limited to: (i) information permanently stored on non-writable storage media (e.g., read-only memory devices within a computer such as CD-ROM disks readable by a CD-ROM drive);(ii) alterable information stored on writable storage media (e.g., floppy disks within a diskette drive or hard-disk drive); or (iii) information conveyed to a computer by a communications medium, such as though a computer or telephone network, including wireless communications. The latter embodiment specifically includes information downloaded from the Internet and other networks. Such computer-readable mediums, when carrying computer-readable instructions that direct the functions of the present invention, represent embodiments of the present invention. A computer-readable storage mediums include CD-ROM disks readable by a CD-ROM drive and storage media (e.g., floppy disks within a diskette drive or hard-disk drive).

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Environment

Figure 1:
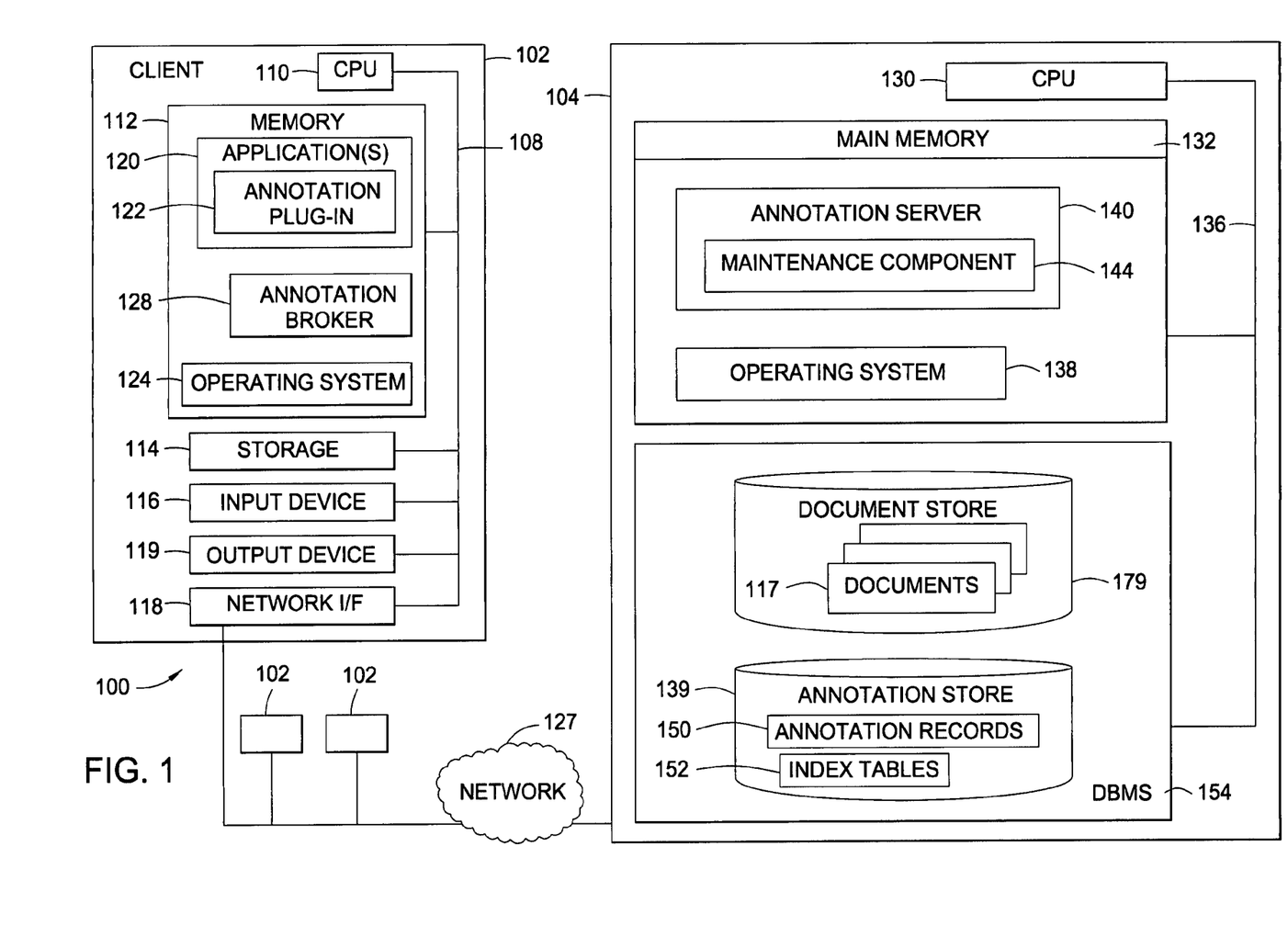
FIG. 1 is a computer system illustratively utilized in accordance with embodiments of the present invention.

FIG. 1 illustrates a client-server view of an exemplary system 100 in which an annotation system in accordance with the present invention may be utilized to exchange information, captured in the form of annotations, between users collaborating on a project. For some embodiments, the annotation system utilized in the system 100 may be similar in operation to an annotation system described in the commonly owned, co-pending application Ser. No. 10/600,014, entitled "Universal Annotation Management System."

As illustrated, the system 100 generally includes one or more client computers 102 (e.g., user workstations) and at least one server computer 104. The client computers 102 and server computer 104 may be connected via a network 127. In general, the network 127 may be any combination of a local area network (LAN), a wide area network (WAN), wireless network, or any other suitable type network, including the Internet.

As illustrated, the client computers 102 generally include a Central Processing Unit (CPU) 110 connected via a bus 108 to a memory 112, storage 114, input devices 116, output devices 119, and a network interface device 118. The input devices 116 may be any devices to give input to the client computer 102, such as a mouse, keyboard, keypad, light-pen, touch-screen, track-ball, or speech recognition unit, audio/video player, and the like. The output devices 119 may be any suitable devices to give output to the user, including speakers and any of various types of display screen. Although shown separately from the input device 116, the output device 119 and input device 116 could be combined (e.g., a display screen with an integrated touch-screen.

The network interface device 118 may be any entry/exit device configured to allow network communications between the client computer 102 and the server computer 104 via the network 127. For example, the network interface device 118 may be a network adapter or other network interface card (NIC). Storage 114 is preferably a Direct Access Storage Device (DASD). Although shown as a single unit, storage 114 may be any combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips. Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing at least one application 120 (optionally shown with an associated annotation plug-in 122 and an annotation broker 128). The application 120 may be any of a variety of applications used to manipulate (e.g., create, view, and/or edit) documents 117. For example, the application 120 may be a text editor/word processor used to manipulate annotatable documents, a document generator/viewer (such as Adobe's Acrobat® and Acrobat Reader) used to manipulate documents, or data analysis software, such as Decision Site available from Spotfire, Inc., imaging software used to manipulate images, and any other types of applications used to manipulate various types and forms of data that may be embodied in documents 117.

The documents 117 may be stored in a separate data store 179 than annotations describing them (which may be stored in an annotation store 139). Different versions of documents 117 may exist at any given time. As described herein, a number of different "annotation versioning" policies may be available to determine how annotations originally made for one version of a document 117 may be applied to subsequent versions of the same document 117.

Some application programs 120 may be configured to communicate with the annotation server 140 directly, for example, via a set of application programming interface (API) functions (not shown) provided for the annotation server 140. As used herein, the term API generally refers to any set of interface functions (e.g., implementing any suitable inter-process protocol) that may be used to communicate between a client computer or process and a server computer or process. Other application programs, however, may communicate with the annotation server 140 via plug-in components 122 and/or the annotation broker 128 (e.g. also via API functions). In other words, annotation capability may be added to an existing application 120 via the plug-in components 122. The plug-in components 122 may, for example, present graphical user interface (GUI) screens to users of applications 120, thus allowing the creation and retrieval of annotations from within the applications used to manipulate the annotated data.

The annotation broker 128 is an optional component and may be implemented as a software component configured to present a standard interface to the annotation server 140 from various applications 120, for example, communicating with plug-in components 122 from multiple applications running on the same client computer 102. Hence, the annotation broker 128 may provide a degree of separation between the applications 120 and the annotation server 140, hiding detailed operation of the annotation server 140 and facilitating development of plug-in components 122. In other words, new applications 120 may be supported through the development of plug-in components 122 written in accordance with the annotation broker interface.

Components of the server computer 104 may be physically arranged in a manner similar to those of the client computer 102. For example, the server computer 104 is shown generally comprising a CPU 135, a memory 132, and a storage system, such as a database management system 154, coupled to one another by a bus 136, which may all functions as similar components described with reference to the client computer 102. The server computer 104 is generally under the control of an operating system 138 (e.g., IBM OS/400®, UNIX, Microsoft Windows®, and the like) shown residing in memory 132.

As illustrated, the server computer 104 may be configured with the annotation server 140, also shown residing in memory 132. The annotation server 140 provides annotation clients (e.g., running on one or more client computers 102) with access to the annotation store 139, for example, via annotation API functions. In other words, the annotation API functions generally define the interface between annotation clients and the annotation server 140. As used herein, the term annotation client generally refers to any user interface (or other type front-end logic) of the annotation system that communicates with the annotation server to manipulate (e.g., create, update, read and query) annotation data. Examples of annotation clients include applications 120 communicating with the annotation server 140 (directly, or via plug-in components 122) or an external application, such as an annotation browser (not shown).

The annotation server 140 may be configured to perform a variety of operations, such as responding to requests to create annotations for specified data objects, formulating and issuing queries against the annotation store 139 to search for annotations for a specified data object, and formulating and issuing queries against the annotation store 139 to search for annotations satisfying one or more specified conditions (e.g., having a specified author, creation date, content, and the like). The annotations may be contained in annotation records 150, for example, stored in an annotation store 139.

The annotation records 150 may also contain various information about the annotation, such as the author and creation date of the annotation, as well as an index identifying annotated portions of documents 117. For some embodiments, the annotation server 140 may include an indexing component (shown in FIG. 2) configured to generate an index for an annotated data object, for example, based on one or more parameters identifying the annotated data object (e.g., a database table, row, and/or column). Indexes created for annotated portions of documents 117 may be stored in an index table 152 in the annotation store 139. For some embodiments, the index table 152 may be queried to identify annotations for documents 117.

As illustrated, the annotation server 140 may have an associated maintenance component 144 generally configured to maintain annotations for documents 117. As will be described in greater detail below, the annotation maintenance component 144 may play a role in implementing and enforcing policies for maintaining annotations when changes are made to annotated documents 117.

Figure 2:
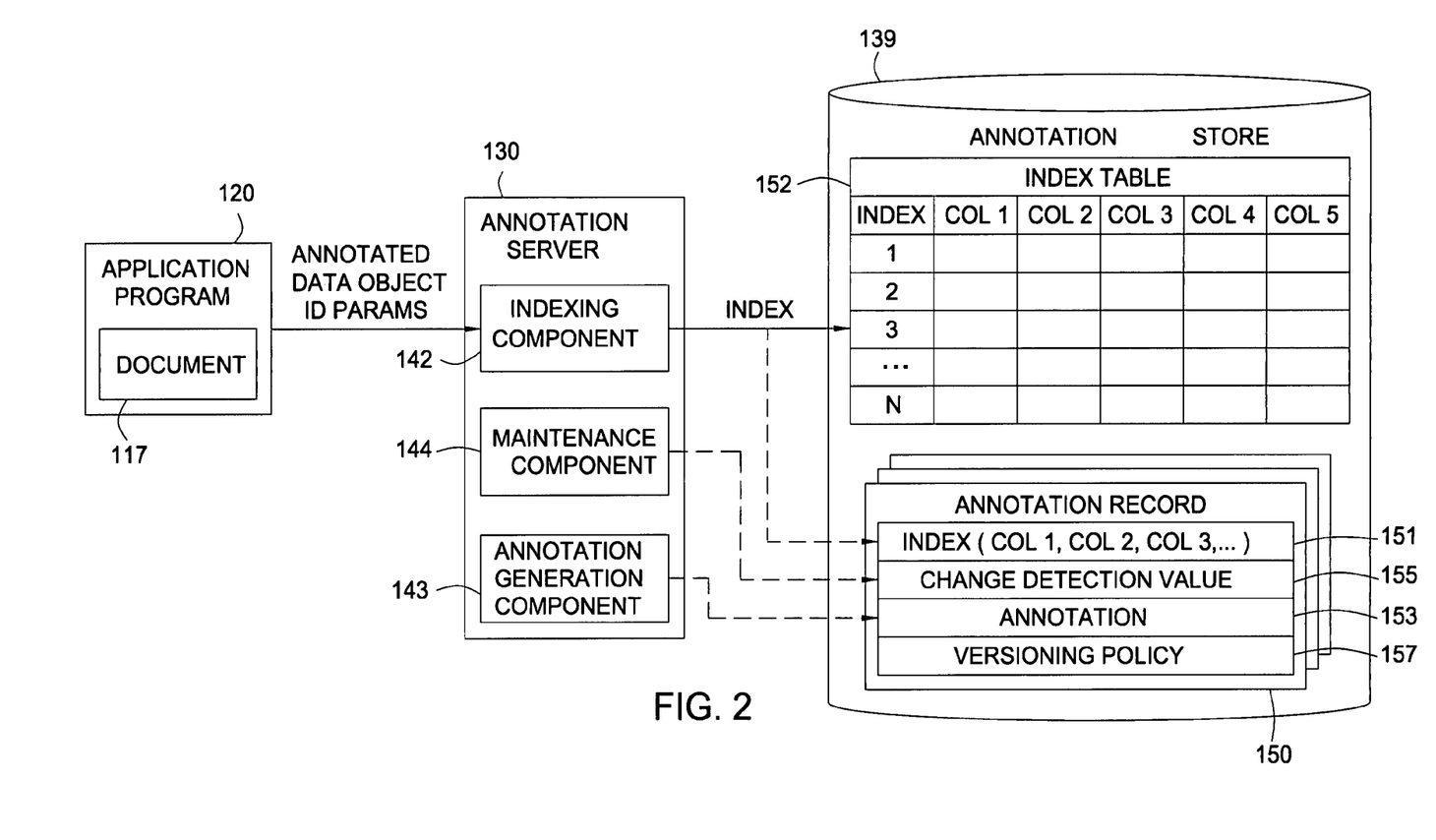
FIG. 2 is a relational view of software components according to one embodiment of the present invention.

FIG. 2 is a relational view of software components, including the annotation maintenance component 144, according to one embodiment of the present invention, shown during annotation generation. As illustrated, an annotation 153 for a portion of a document 117 (identified by a set of ID parameters) may be created via an annotation generation component 143. An indexing component 142 may create an index 151 based on the set of ID parameters, for use in indexing the annotation 153 created for the identified data object. In general, an index 151 points to the annotated portion or position within a corresponding annotated document 117.

A corresponding entry for the index 151 may be placed in the index table 152, allowing the index table 152 to be queried to identify documents and portions of documents having corresponding annotations. For some embodiments, entries in the index table 152 may simply contain ID parameters indicating an annotated data object (e.g., identification of a data source/table, a row, and column). For other embodiments, however, table entries may include index parameters generated based on the ID parameters. Such indexing techniques are described in the commonly assigned, co-pending application Ser. No. 10/600,382, entitled "Heterogeneous Multi-Level Extendable Indexing For General Purpose Annotation Systems," filed Jun. 20, 2003.

The annotation maintenance component 144 may also generate a change detection value 155 (e.g., a checksum or hash value, such as MD5) for the annotated document or annotated portion of the document, to be stored in the annotation record 150. The annotation maintenance component 144 may detect changes in a document 117 or portion of a document 117 associated with an annotation by generating a new change detection value and comparing it to the change detection value stored in the corresponding annotation record 150. The generation and use of change detection values is described in detail in the commonly assigned, co-pending application Ser. No. 10/310,192, entitled "Annotation Validation Using Partial Checksums." In response to detecting a change to an annotated document 117, the annotation maintenance component 144 may delete, modify (e.g. update an index 151), or maintain the annotation record 150 as-is, depending on a type of policy selected for maintaining annotations for different versions of documents 117, which may be stored in the annotation record as a versioning policy attribute 157.

Exemplary Annotation Versioning Policies

Figure 3:
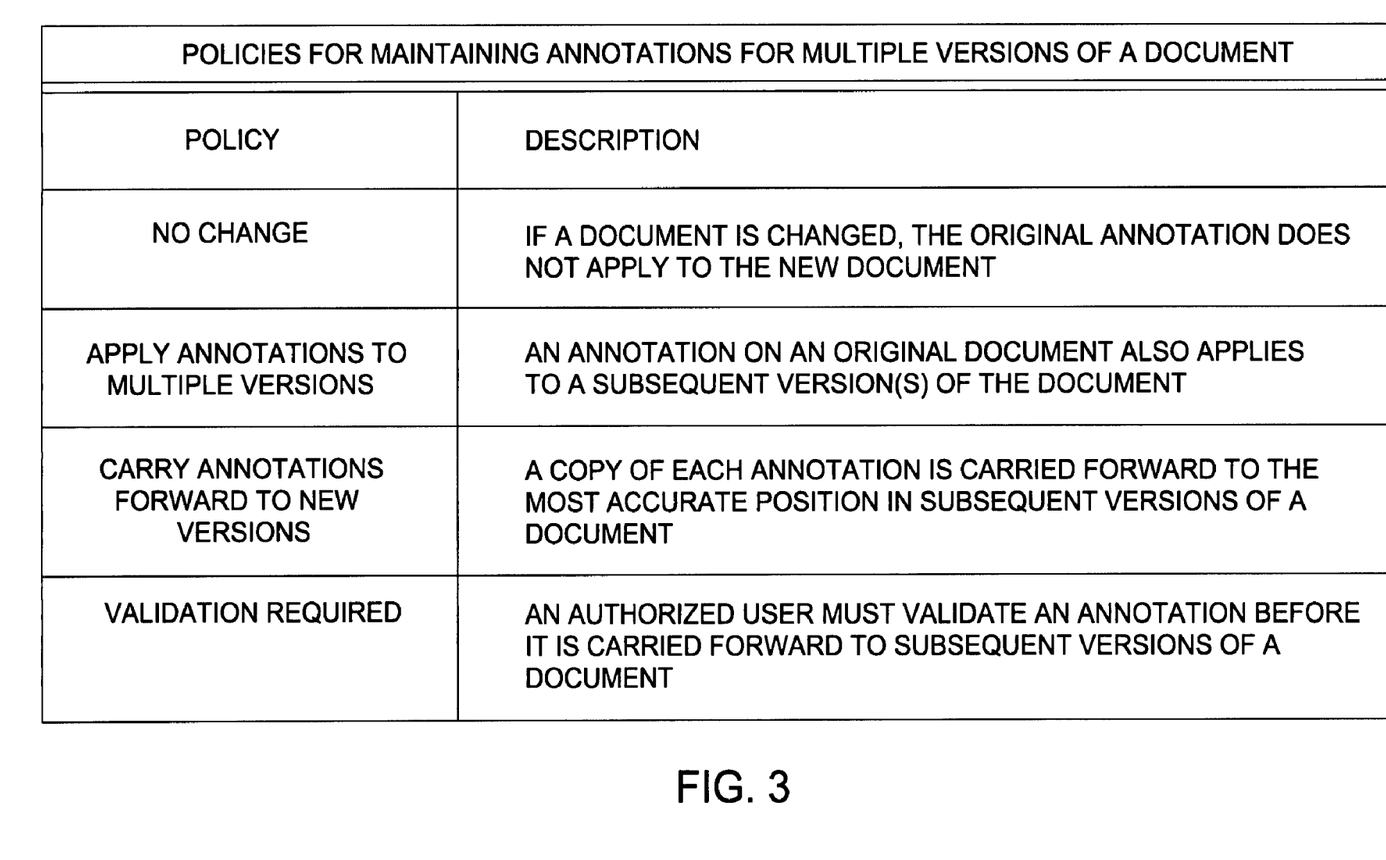
FIG. 3 is a table illustrating exemplary policies for maintaining annotations for multiple versions of a document.

FIG. 3 shows a table 300 illustrating exemplary policies for maintaining annotations for multiple versions of a document (hereinafter "annotation versioning policies" or simply "policies"). The policies may be applied at the annotation level, the document level, or some combination of both. In other words, in some cases, annotation policies may be set from within a document (or application used to manipulate that document), and applied to all annotations created for that document. In some cases, annotation policies may be set when an annotation is created. In some cases, a default policy may be set at the document level, which may be changed when creating an annotation.

In any case, the first policy shown in table 300 is a "no-change" policy dictating that annotations stay with the original version of a document for which they were created and do not apply to subsequent versions. In other words, if a document is changed, the old annotation does not apply to the new document. Indexes to the original document apply to the annotation, while indexes in the new document do not. Content of the annotation may be changed, with the changed content applying to the same version document as the original content.

The second policy shown in table 300 dictates that annotations are applied to multiple versions of a document. An annotation on an original document also points to subsequent (changed) versions of the document, for example, by modifying an index in an annotation record to refer to the multiple versions of the document. In other words, a user would see the same annotation whether viewing the old or a newer version of the document. If a change is made to the annotation content, the change in annotation content will appear whether the old or newer version of the document is displayed. While this may cause confusion if the changes to the source document are large and varied, it may be a preferred policy in some cases. For example, there may be cases where an annotation captures a general insight regarding a topic addressed in an annotated portion. As such, the annotation is likely to remain valid regardless of changes to the annotated document or the annotated portion of the document.

A third policy shown dictates that for each changed version of a document, each annotation is carried forward to the most accurate position in the document. In other words, multiple copies of annotation records 150 may exist for each annotation, with the index of each subsequent copy updated to reflect the changes between versions. For some embodiments, indexes may be updated automatically (e.g., an application may scan a document to identify an originally annotated portion in a subsequent version). In some cases, however, an originally annotated portion may not be readily identified in a subsequent version, due to the magnitude of changes or deletion. As a result, in some cases, this approach may lead to annotations being carried forward regardless of semantic and contextual correctness.

Therefore, for some embodiments, a user may specify that annotations must be validated (by someone with authority) before they are carried forward to new versions of a document. This policy (last in table 300) may be applicable in an environment where the person who makes the changes to the document also has authority to see and determine the applicability of a previous annotation to the changed document. This policy may be used in conjunction with the second or third policies. A related policy may dictate that annotations viewed from a different version of a document (e.g., other than the version for which it was created) should be marked as unverified indicating it was carried forward but has not been formally approved, effectively putting a viewer on notice they must determine whether the annotation still applies. An authorized user, such as the original author of the annotation, may re-verify the annotation, resulting in removal of the unverified marking. In some cases, other types of users may be authorized to re-verify an annotation, for example, if they are in a position to be able to determine the annotation still applies to a new version.

It should be understood that the listed policies are exemplary only and that different embodiments of annotation systems may support more, less, or different policies than those listed. Further, as will be described below, some of the listed policies may be combined. Policies may also be added and removed from the system, for example, according to customer or administrative needs. An administrator of the system may select one or more policies to make available to users during system configuration and may also indicate a default policy. Users may also be allowed to set their own policy from the set of available policies. In other words, a user creating an annotation may select from whatever policies are allowed to apply to their annotation.

Exemplary Graphical User Interface Screens

Figure 4A:
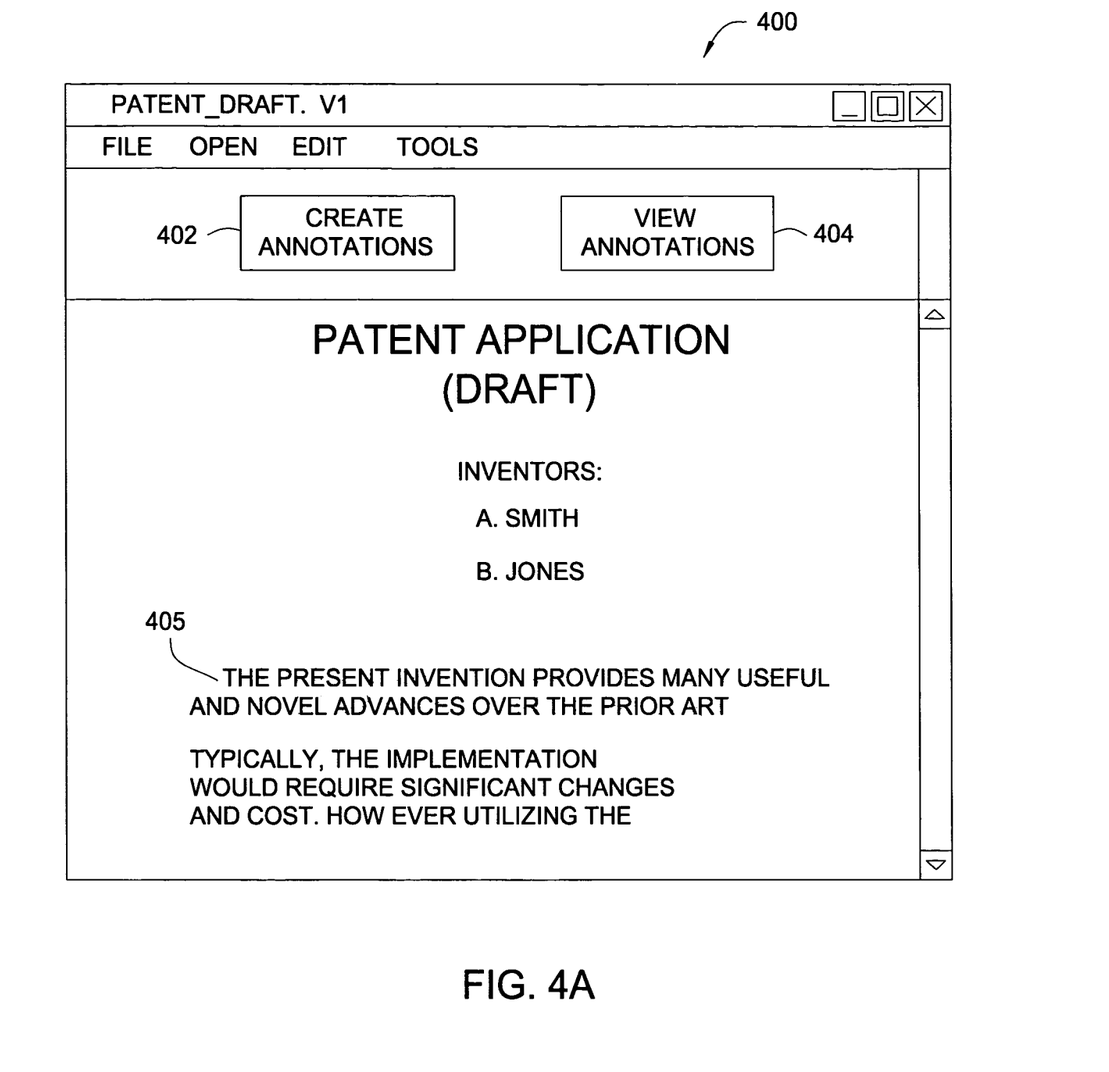
FIGS. 4A-4D illustrate exemplary graphical user interface (GUI) screens for creating and viewing annotations according to one embodiment of the present invention.

For example, FIGS. 4A-4D illustrate exemplary graphical user interface GUI screens that may be used to create and view an annotation for a document and to select a policy for applying the annotation to subsequent versions of the document. FIG. 4A illustrates an exemplary GUI screen 400 of a text editor used to edit a patent application. As shown, the screen 400 may include Create and View Annotations buttons 402 and 404 provided, for example, as part of an annotation plug-in for the text editor, allowing a user to create and view annotations.

Figure 4B:
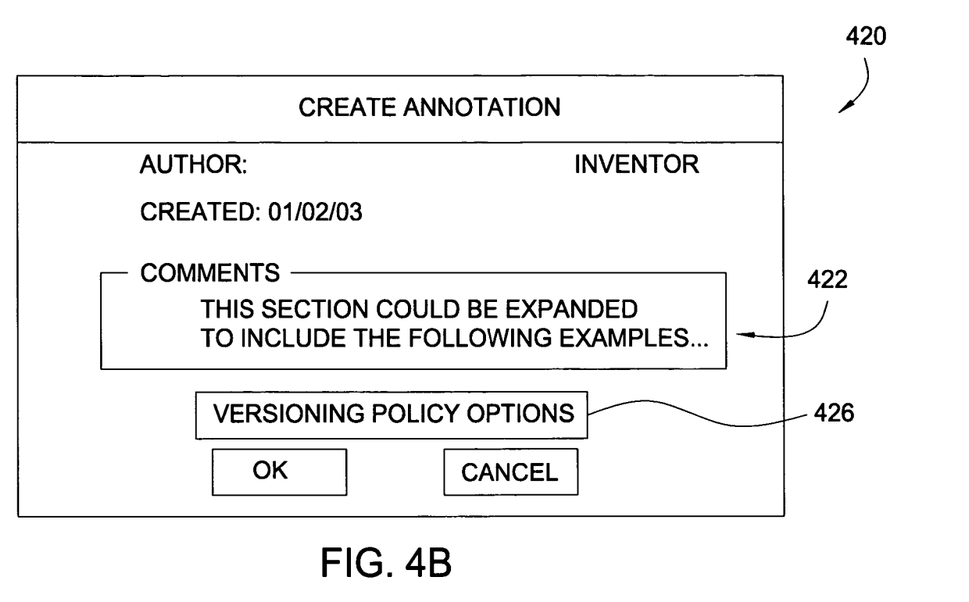

For example, a user may select a highlighted portion of text 405 and select (e.g., click) the Create Annotations button 402 to access a Create Annotation GUI screen 420 shown in FIG. 4B. As illustrated, the GUI screen 420 may allow the user to enter a comment in a text box 422, for example, related to the highlighted text 405. Of course, other types of annotation GUI screens may allow for various other types of annotation content other than text comments, such as values associated with quality, approval, and the like. In any case, the user may be able to specify one or more policies that dictate how the annotation should be applied to subsequent versions of the document. For example, the user may be able to specify the annotation should be carried forward to subsequent versions of the document (e.g., as with the second and third policies listed in table 300 of FIG. 3).

Figure 4C:
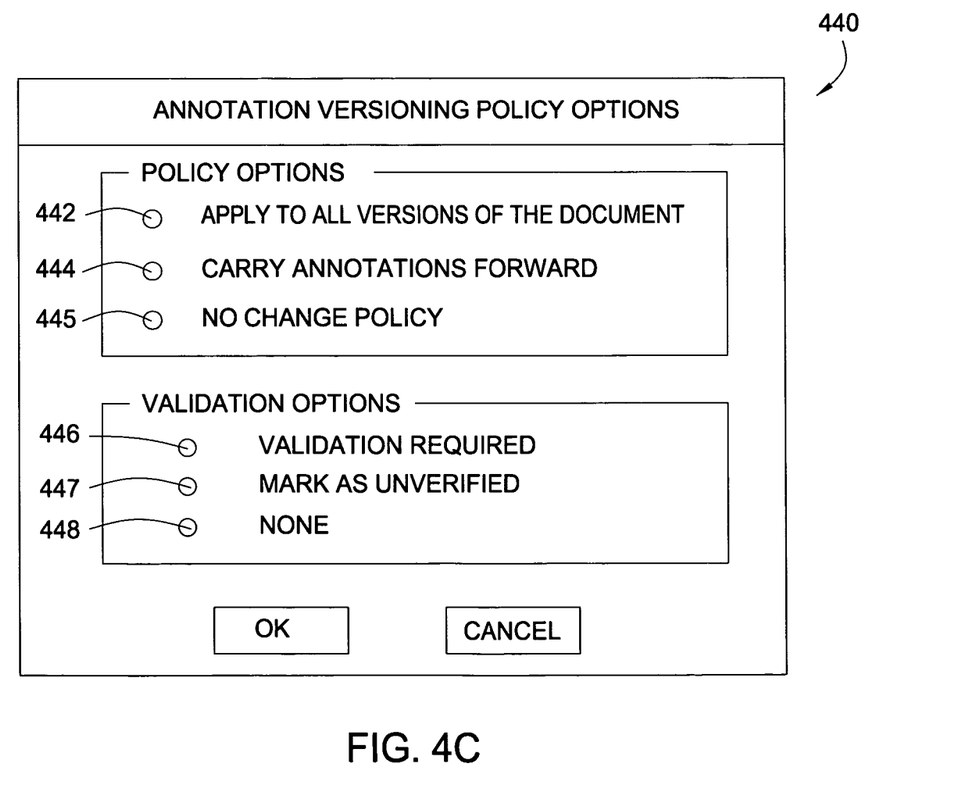

The user may also be able to specify policy options for applying the annotation to subsequent versions of the document, for example, via the GUI screen 440 of FIG. 4C, which may be accessed via a VERSIONING POLICY OPTIONS button 426. As illustrated, the GUI screen 440 may allow, the user (via radio buttons 442, 444, and 445) to specify whether the annotation should be applied to all versions of the document (i.e., the second policy of table 300), carried forward to subsequent versions of the document (i.e., the third policy of table 300), or applied only to the original annotated version of the document (i.e., the first policy of table 300), respectively.

A number of validation options may be specified if the annotation is applied or carried forward to subsequent versions. For example, a user may specify (via radio buttons 446, 447, and 448, respectively) that validation may be required prior to carrying the annotation forward to subsequent versions, that the annotation may be carried forward automatically and marked as unverified, or neither. As will be described in greater detail below, if user validation is required, the annotation maintenance component may be configured to notify the user (e.g., via e-mail, instant message, or other type of notification technique) in the event a change to the annotated document is detected.

Figure 4D:
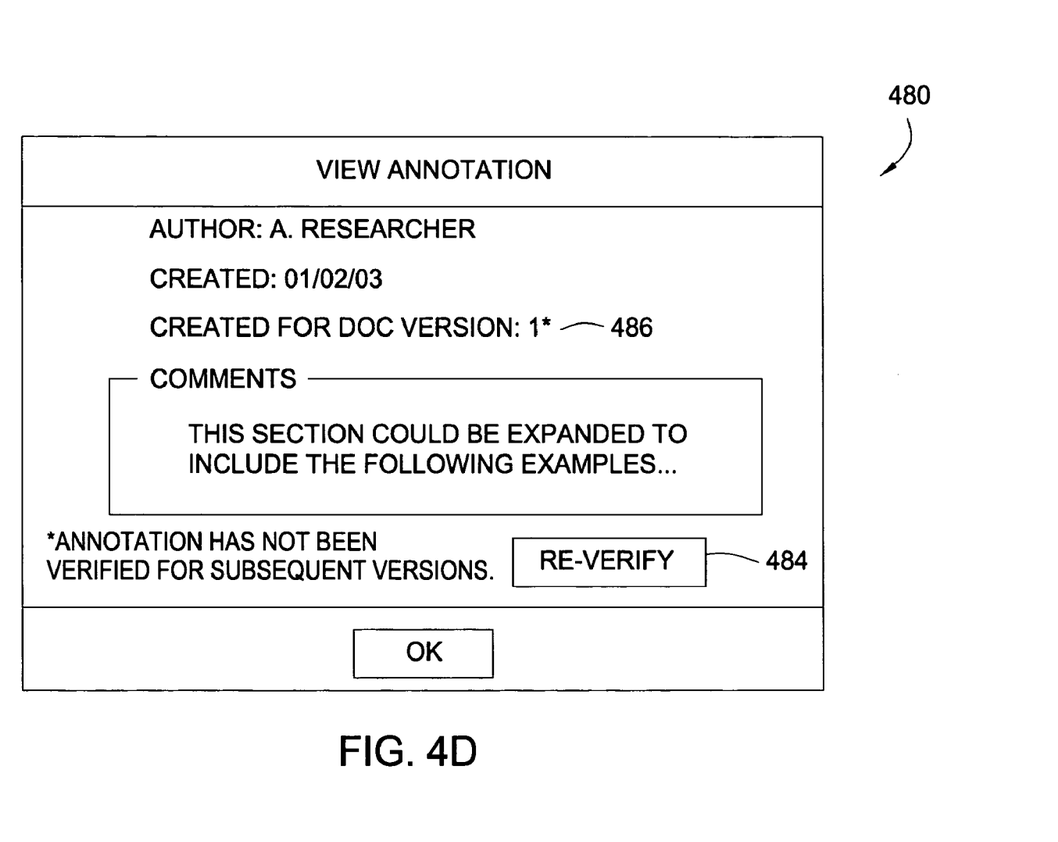

FIG. 4D illustrates an exemplary GUI screen 480 for viewing an annotation. For example, the GUI screen 480 may be displayed in response to a user (viewing a document in the GUI screen 400 of FIG. 4A) selecting the VIEW ANNOTATIONS button 404. As illustrated, the GUI screen 480 may provide an indication 486 that the annotation is unverified, for example, indicating the viewed annotation was carried forward from a previous document and may or may not apply to the current version of the document. If authorized, the user may be able to re-verify the annotation, via a button 484, which may, for example, be used to access another GUI screen used to verify the annotation, modify the content, manually update the annotation index, or even delete the annotation if it no longer applies (to the current version). For some embodiments, the user may also be able to change the versioning policy. In any case, if the user is able to re-verify the annotation, the indication 486 may be removed.

Annotation Versioning Policy Enforcement

For some embodiments, the types of annotation versioning policies available to a user may be set by an administrator. For example, the administrator may determine what type of policies are available to the user via the GUI screens described above and/or may select some type of versioning policies to be applied as a default. In some cases, the types of policies made available may depend on the type of document being annotated, some type of user credential (e.g., a specified user role or authorization level), or a combination thereof. For example, certain annotation versioning policies, such as carrying an annotation forward, may only be available to certain authorized users.

Figure 5:
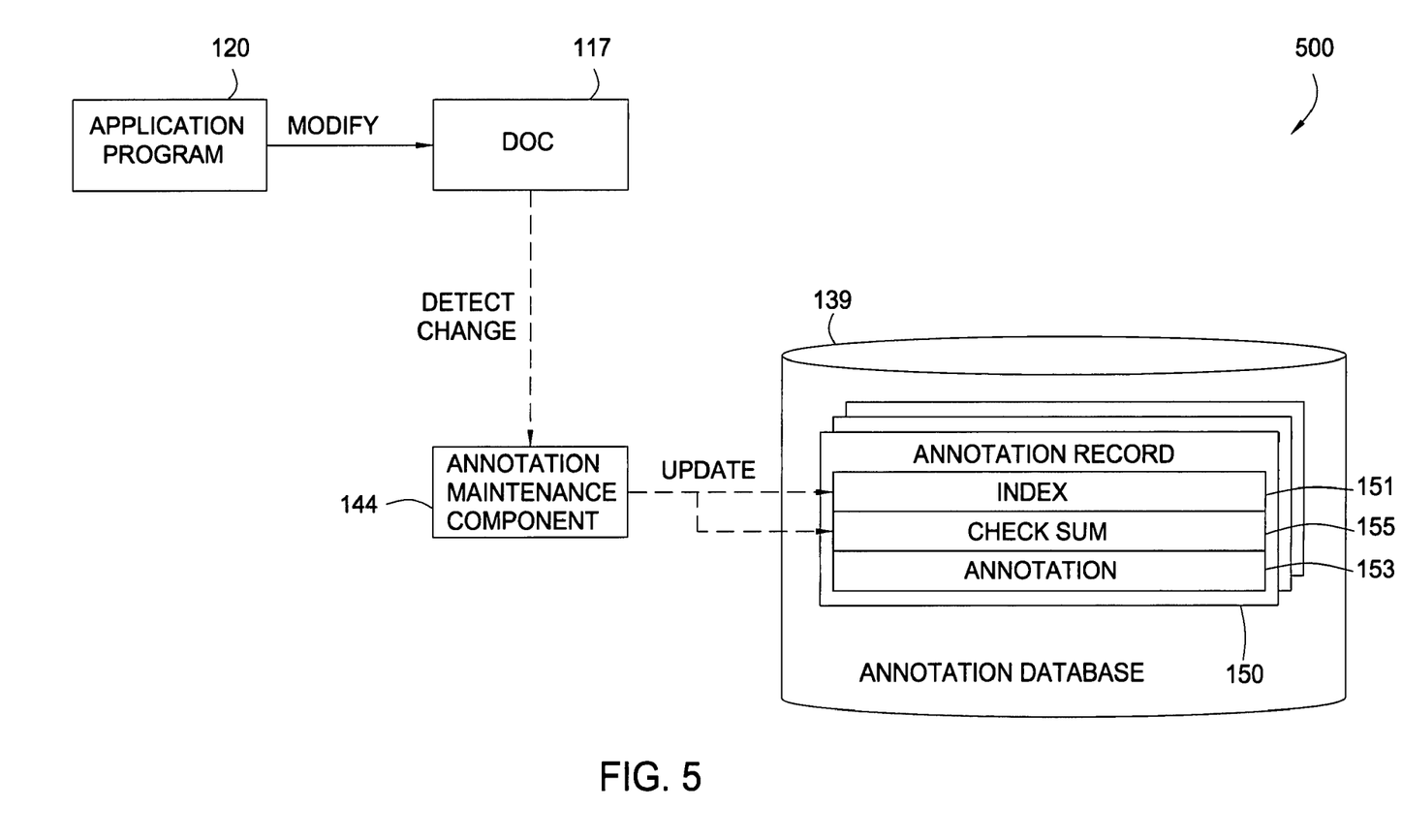
FIG. 5 is another relational view of software components according to one embodiment of the present invention.

For some embodiments, the annotation maintenance component 144 may enforce annotation versioning policies when a document 117 is modified, creating a new version of the document (regardless of whether a previous version is maintained). For example, FIG. 5 illustrates a relational view of software components of a system 500 in which an annotation maintenance component 144 enforces annotation versioning policies as annotated documents 117 are modified by an application program 120.

Figure 6:
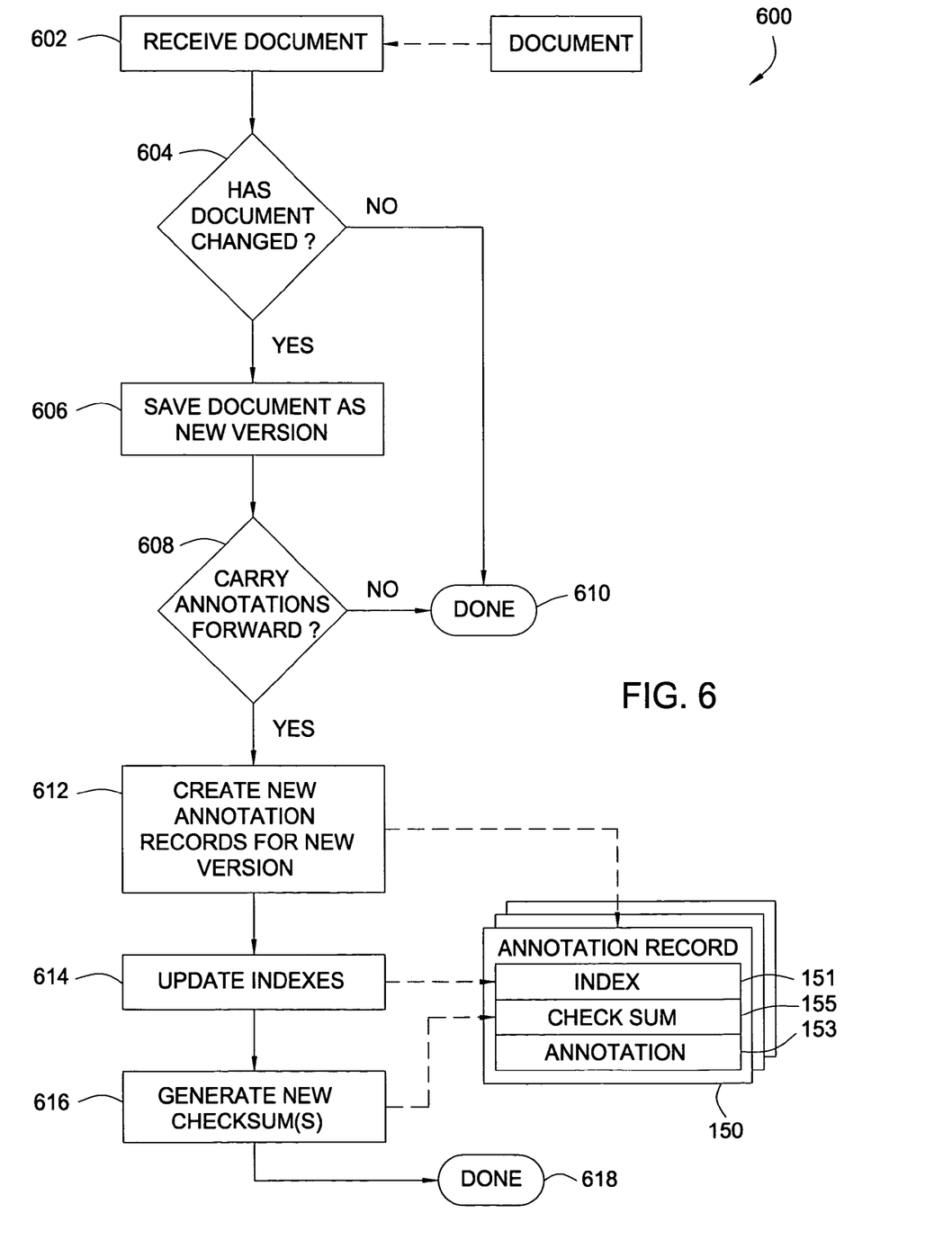
FIG. 6 is a flow chart illustrating exemplary operations for maintaining annotations for multiple versions of a document according to one embodiment of the present invention.

Operation of the system 500 may be described with reference to FIG. 6, which illustrates a flow chart of exemplary operations 600 that may be performed, for example by the annotation maintenance component 144, to maintain annotations for multiple versions of documents according to one embodiment of the present invention. In some cases, the annotation maintenance component 144 may be integrated with an application 120 as a plug-in component. While the operations 600 will be described generally with reference to modifications of annotated documents, it should be understood that the operations 600 also apply to changes that are specific to annotated subportions of a document.

The operations 600 begin, at step 602, by receiving an annotated document 117, for example, by the annotation maintenance component 144 that has been modified via an application 120. At step 604, a determination is made as to whether the document has changed, for example, by comparing a change detection value 155 stored in a corresponding annotation record 150 with a changed detection value calculated for the document 117. If the document 117 has not changed, the operations 600 are exited, at step 610.

If the document 117 has changed, the document 117 is saved as a new version (or at least the revised document 117 is saved), at step 606. At step 608, a determination is made as to whether annotations are to be carried forward to the new version of the document 117. If not, the operations 600 are exited, at step 610. If annotations are to be carried forward to the new version of the document 117, new annotation records 150 for the new version of the document are created (or existing annotation records 150 are updated) at step 612. At step 614, the annotation indexes 151 are updated to refer positions in the new version of the document 117 and a new change detection value 155 is generated for the new version of the document, at step 616.

Depending on the annotation versioning policy selected (e.g., by the annotation author), the annotation maintenance component 144 may carry annotations forward to refer to their respective positions within a document 117 when that document 117 changes. For example, after the revised document 117 has been saved, the annotation maintenance component 144 may then create and store new annotation records (with indexes referring to the revised document 117) in the annotation store 139. As previously described, the annotation maintenance component 144 may update the corresponding index 151 to reflect the revised document and update the change detection value 155 (illustratively shown as a checksum) to reflect revisions to the annotated document 117 or the corresponding annotated portion thereof.

Figure 7:
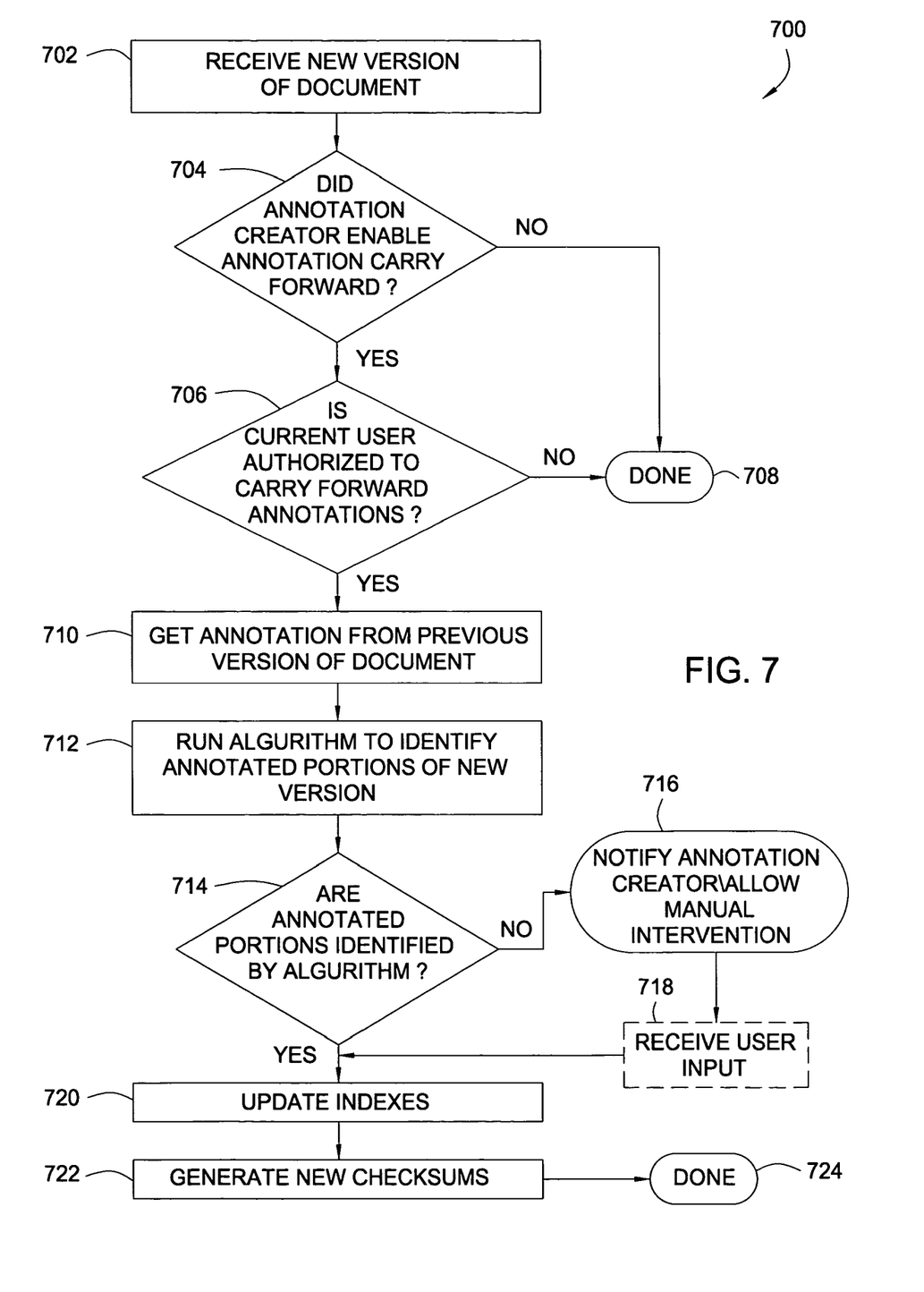
FIG. 7 is a flow chart illustrating exemplary operations for enforcing annotation maintenance policies according to one embodiment of the present invention.

As previously described with reference to FIGS. 3 and 4A-4D, exactly when and how annotations are carried forward (e.g., steps 612-616 of FIG. 6) may depend on options a user selected when creating the annotation and whether a current user (is authorized. In some cases, annotation records may be automatically created/updated or user interaction may be required, in some instances. FIG. 7 illustrates a flow diagram of exemplary operations 700 that illustrate how and when an annotation may be carried forward and when user interaction may be sought, for example, based on options selected creator or author of the original annotation.

The operations 700 begin, at step 702, by receiving a document 117. At step 704, a determination is made as to whether the annotation creator enabled annotation carry forward, for example, via check box 424 of FIG. 4B. If so, a determination is then made, at step 706, as to whether a current user (e.g., a user checking in the document 117) is authorized to carry forward annotations. For example, depending on the system settings, only users operating in certain roles may be authorized to carry annotations forward. If the current user is not authorized to carry annotation forward, the operations are exited, at step 708, for example, by checking in the document 117 without carrying annotations forward.

If the user is authorized to carry annotations forward, annotations from previous versions of the document are retrieved, at step 710. As previously described, for some embodiments, the annotation maintenance component 144 may be configured to automatically update indexes to refer to annotated portions of a revised document. Therefore, at step 712, an algorithm is run to identify (previously) annotated portions in the new version of the document 117. For example, the algorithm may employ pattern matching, searching the new version of the document 117 for annotated portions from the previously annotated version of the document 117. If the annotated portions are identified by the algorithm (step 714), the indexes are automatically updated, at step 720 and new change detection values are generated at step 722, prior to exiting the operations 700, at step 724.

If the algorithm did not identify the annotated portions in the new version of the document 117, a user (e.g., the original annotation author or last user to modify the annotation) may be notified, at step 716. For example, the user may be given the opportunity to utilize a tool to manually identify the portions of the new version of the document 117 to which the annotations should be carried forward. For some embodiments, the tool may indicate to the user where the annotation may apply based on results of the algorithm (e.g., by highlighting text in the document 117, such highlighted text 405 in FIG. 4A) and lets the user carry the annotations forward to the new version of the document 117. Input from the user (e.g., a manual selection indicating annotated portions in the new version of the document 117) may be received, at step 718, and used to update the indexes at step 720.

As previously described, user input may also be required if the creator of the annotation specified that validation is required for carrying an annotation forward (e.g., by the annotation author or other authorized user). In any case, a user may be able to access a document while the carrying forward of annotations related to the document is pending another user's actions to carry it forward (e.g., validation or identification of the annotated portions in a new version). In such cases, the user accessing the document may be notified that there are pending changes to be made for annotations related to the document. Further, as previously described, annotations for such a document may be marked as unverified while the changes are pending.

Conclusion

By supporting multiple policies for applying annotations to different versions of documents, users may be able to select a policy that best fits their needs and gain some level of assurance the annotations will be properly applied as the document changes. As a result, multiple users accessing a shared set of documents may be assured that annotations for the documents are valid and apply to the current versions of the documents.

While the foregoing is directed to embodiments of the present invention, other and further embodiments of the invention may be devised without departing from the basic scope thereof, and the scope thereof is determined by the claims that follow.

What is claimed is:

1. A method for managing annotations for multiple versions of documents, the method comprising:
   selecting one or more annotation versioning policies dictating how annotations made for a current version of a document are carried forward by operation of one or more computer processors to a subsequent version of the document, wherein the subsequent version of the document includes one or more revisions to contents of the current version of the document, and wherein carrying the annotations forward comprises:

storing, for the subsequent version of the document, an annotation record comprising:
(i) an annotation of the annotations made for the current version of the document;
(ii) an index that identifies positions of the annotations in the subsequent version of the document;
(iii) a change detection value for detecting revisions to: (A) the subsequent version of the document or (B) an annotated portion of the subsequent version of the document, corresponding to the annotation; and
(iv) a versioning policy attribute referencing one of the selected annotation versioning policies dictating how annotations made for the current version of the document are carried forward to one or more subsequent versions of the document; and allowing creators of annotations for the current version of the document to select one or more of the annotation versioning policies to dictate how the annotations made for a current version of a document are carried forward to one or more subsequent versions of the document;

determining, by operation of one or more computer processors, whether the annotations in the current version of the document are to be carried forward to the subsequent version of the document; and upon determining that the annotations are to be carried forward, carrying the annotations forward to the subsequent version of the document.

2. The method of claim 1, wherein at least one of the annotation versioning policies dictates that annotations made for a current version of a document will not be carried forward to subsequent versions of the document.

3. The method of claim 1, wherein the one or more annotation versioning policies selected are applied at the document level, to all annotations created for a document.

4. The method of claim 1, wherein at least one of the annotation versioning policies dictates that an annotation created for a current version of a document will be carried forward to subsequent versions of the document.

5. The method of claim 1, wherein at least one of the annotation versioning policies dictates that an authorized user must validate an annotation created for a current version of a document before the annotation is carried forward to subsequent versions of the document.

6. A method for managing annotations for multiple versions of documents, the method comprising:

defining a set of available annotation policies, each dictating how an annotation created for a current version of a document are carried forward by operation of one or more computer processors to one or more subsequent versions of the document, wherein each subsequent version of the document includes one or more revisions to contents of the current version of the document, and wherein carrying the annotation forward comprises:

storing, for the subsequent version of the document, an annotation record comprising:
(i) the annotation created for the current version of the document;
(ii) an index that identifies positions of the annotations in the subsequent version of the document;
(iii) a change detection value for detecting revisions to: (A) the subsequent version of the document or (B) a corresponding annotated portion of the subsequent version of the document; and
(iv) a versioning policy attribute referencing one of the defined set of annotation policies dictating how annotations made for the current version of the document are carried forward to one or more subsequent versions of the document; and providing an interface, by operation of the one or more computer processors, allowing a user to select one or more of the available annotation policies that dictate how an annotation created for a current version of a document are carried forward to one or more subsequent versions of the document;

determining, by operation of one or more computer processors, whether the annotations in the current version of the document are to be carried forward to the subsequent version of the document; and upon determining that the annotations are to be carried forward, carrying the annotations forward to the subsequent version of the document.

7. The method of claim 6, wherein defining a set of available annotation policies comprises associating one or more annotation policies for use with annotations made for a certain document type.

8. The method of claim 6, wherein the annotation policies provided to the user in the interface is determined at least in part on a credential of the user.

9. The method of claim 8, wherein the annotation policies provided to the user in the interface is determined at least in part on a document type associated with the annotation.

10. The method of claim 6, wherein defining a set of available annotation policies comprises defining the set of available annotation policies by an administrator, wherein the administrator and the user are different entities.

11. The method of claim 1, wherein at least one of the annotation versioning policies dictates that an annotation created for a current version of a document and carried forward to a subsequent version of the document includes a marker indicating that the annotation in the subsequent version of the document is unverified.

12. The method of claim 11, wherein the marker is included in the annotation in the subsequent version of the document until an authorized user verifies the annotation created for the current version of the document.

13. A computer-readable storage medium containing a program which, when executed by a processor, performs an operation for managing annotations for multiple versions of documents, the operation comprising:

defining a set of available annotation policies, each dictating how an annotation created for a current version of a document are carried forward by operation of one or more computer processors to one or more subsequent versions of the document, wherein each subsequent version of the document includes one or more revisions to contents of the current version of the document, and wherein carrying the annotation forward comprises:

storing, for the subsequent version of the document, an annotation record comprising:
(i) the annotation created for the current version of the document;
(ii) an index that identifies positions of the annotations in the subsequent version of the document;
(iii) a change detection value for detecting revisions to: (A) the subsequent version of the document or (B) a corresponding annotated portion of the subsequent version of the document; and
(iv) a versioning policy attribute referencing one of the defined set of annotation policies dictating how annotations made for the current version of the document are carried forward to one or more subsequent versions of the document; and providing an interface, by operation of one or more computer processors, allowing a user to select one or more of the available annotation policies that dictate how an annotation created for a current version of a document are carried forward to one or more subsequent versions of the document;

determining, by operation of one or more computer processors, whether the annotations in the current version of the document are to be carried forward to the subsequent version of the document; and upon determining that the annotations are to be carried forward, carrying the annotations forward to the subsequent version of the document.

14. The computer-readable storage medium of claim 13, wherein defining a set of available annotation policies comprises associating one or more annotation policies for use with annotations made for a certain document type.

15. The computer-readable storage medium of claim 13, wherein the annotation policies provided to the user in the interface is determined at least in part on a credential of the user.

16. The computer-readable storage medium of claim 15, wherein the annotation policies provided to the user in the interface is determined at least in part on a document type associated with the annotation.

17. The computer readable storage medium of claim 13, wherein the set of available annotation policies is defined based on user input from an administrator, wherein the administrator and the user are different entities.

18. A system comprising:

a computer processor; and a memory containing a program, which when executed by the computer processor is configured to perform an operation for compensating for managing annotations for multiple versions of documents, the operation comprising:

defining a set of available annotation policies, each dictating how an annotation created for a current version of a document are carried forward to one or more subsequent versions of the document, wherein each subsequent version of the document includes one or more revisions to contents of the current version of the document, and wherein carrying the annotation forward comprises:

storing, for the subsequent version of the document, an annotation record comprising:
(i) the annotation created for the current version of the document;
(ii) an index that identifies positions of the annotations in the subsequent version of the document;
(iii) a change detection value for detecting revisions to: (A) the subsequent version of the document or (B) a corresponding annotated portion of the subsequent version of the document; and
(iv) a versioning policy attribute referencing one of the defined set of annotation policies dictating how annotations made for the current version of the document are carried forward to one or more subsequent versions of the document; and providing an interface allowing a user to select one or more of the available annotation policies that dictate how an annotation created for a current version of a document are carried forward to one or more subsequent versions of the document;

determining, by operation of one or more computer processors, whether the annotations in the current version of the document are to be carried forward to the subsequent version of the document; and upon determining that the annotations are to be carried forward, carrying the annotations forward to the subsequent version of the document.

19. The system of claim 18, wherein defining a set of available annotation policies comprises associating one or more annotation policies for use with annotations made for a certain document type.

20. The system of claim 18, wherein the annotation policies provided to the user in the interface is determined at least in part on a credential of the user.

21. The system of claim 20, wherein the annotation policies provided to the user in the interface is determined at least in part on a document type associated with the annotation.

22. The system of claim 18, wherein the set of available annotation policies is defined based on user input from an administrator, wherein the administrator and the user are different entities.

* * * * *